Jan. 26, 1965     S. ALTER     3,166,859
ELECTRONIC TEACHING SYSTEM

Filed June 21, 1962     4 Sheets-Sheet 1

INVENTOR.
SOLOMON ALTER
BY
ATTORNEY

Jan. 26, 1965 S. ALTER 3,166,859
ELECTRONIC TEACHING SYSTEM
Filed June 21, 1962 4 Sheets-Sheet 3

*INVENTOR.*
SOLOMON ALTER
BY
ATTORNEY

INVENTOR.
SOLOMON ALTER

United States Patent Office 3,166,859
Patented Jan. 26, 1965

3,166,859
ELECTRONIC TEACHING SYSTEM
Solomon Alter, Hartsdale, N.Y., assignor to Edu-Tronics, Inc., Hicksville, N.Y., a corporation of New York
Filed June 21, 1962, Ser. No. 204,156
7 Claims. (Cl. 35—35)

This invention relates to an electronic teaching system, commonly referred to as a language laboratory, and particularly to an improved audio-active electronic teaching system.

Audio-active systems generally comprise a student booth containing means, for example, a headset, enabling the student to receive a program emanating from a console controlled by the instructor, together with an intercommunication system enabling the student to respond to the program and also hear his own voice, and the instructor to monitor and instruct individual or groups of students. To achieve adequate isolation between the students, known systems provide physically-separated, sound-absorbent booths in a permanent installation, requiring, in addition to an extensive interior reconstruction, a costly installation of electrical wiring and conduits. The high cost and cumbersomeness of such systems have limited a wider use of this excellent teaching technique. Efforts to reduce cost have often been done at a sacrifice of the system fidelity. This is undesirable as it is now recognized that poor fidelity, which requires the listener to exert more effort to maintain concentration, leads to early student fatigue and reduced attentiveness. External noise or spurious signals have an equally undesirable effect. In addition, good fidelity is required to determine whether the student is properly reproducing the foreign language that he may be learning with all the proper accents and inflections.

An object of the present invention is to provide an electronic teaching system of high quality requiring low installation costs.

Another object of the invention is to provide an electronic teaching system for a large number of students which can be employed in the average school classroom with only minor conversion.

Still a further object of the invention is an electronic teaching system affording adequate acoustical isolation of the students from one another without the need of expensive student booths.

A further object of the invention is an electronic teaching system adapted for use in several classrooms within the same school requiring only minor installation costs.

Still another object of the invention is to provide an electronic teaching system including a novel chassis construction of low cost, simplifying servicing, and providing excellent isolation of circuit components.

These and other objects of the invention are achieved by an electronic teaching system characterized by a console unit, which is preferably mobile, containing the program source, all of the electronics, including power supplies, required to transmit the program and provide the intercommunication, and a novel cable, to which the console is peferably removably connected, used for routing the audio information to each of the students. The cable is adapted to be attached directly to the wall of the classroom or otherwise installed to follow the classroom contour. At spaced locations along the cable are provided plural connectors for plugging in a student headset and microphone. Thus, the only permanent installation required in the classroom is the wall cable, which is a simple, mechanical job requiring little skill.

The electronics employed affords a high fidelity system minimizing student fatigue, and, in the case of learning a language, enabling accurate reception and reproduction of the foreign pronunciation and intonations. The system is of the low-impedance type, constructed to minimize noise, interference and crosstalk. A novel chassis construction in the console simplifies assembly yet thoroughly isolates each of the student amplifier circuits to prevent spurious signals. A further feature is the use of isolated preamplifier circuits to prevent crosstalk.

The above and other features of the invention, which are believed to be new and are set forth with particularity hereinafter, may best be understood by reference to the following description when taken in conjunction with the accompanying drawings, in which:

FIG. 1 schematically illustrates the teaching system of the invention in a classroom;

Figure 1:
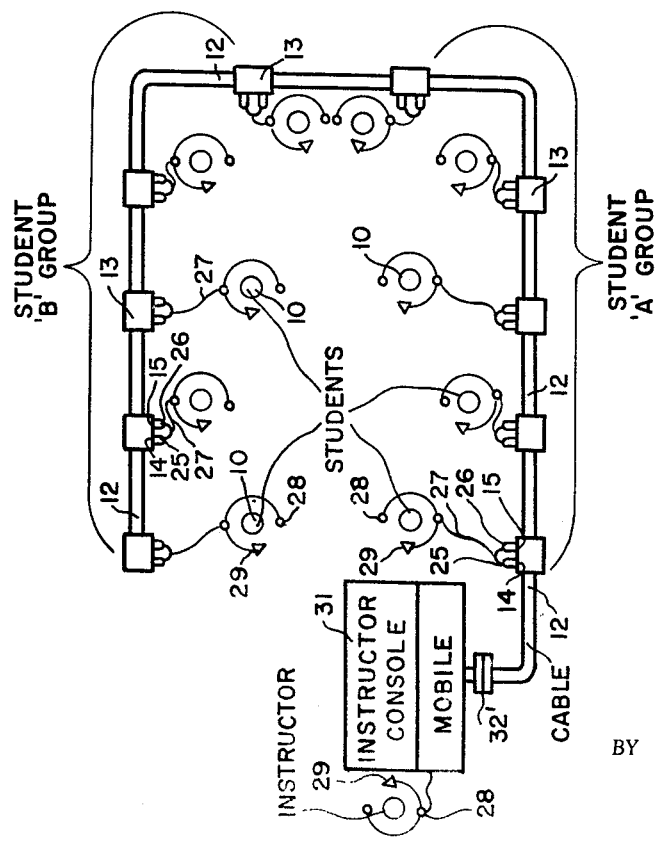

FIG. 1 illustrates one form of a system in accordance with my invention. What is represented in FIG. 1 is a typical open classroom of the type normally found in the average school. The students 10 are seated in the room in normal manner at desks (not shown). If the classroom is intended primarily as an electronic teaching laboratory, it is desirable to leave a center aisle clear for the use of visual aids, which are readily usable with the elimination of the obstructing booths. The only permanent change from a normal classroom is the provision of a special distribution cable 12 running around the room walls along the floor and bent around any obstacles along the way, such as a radiator or doorway. The cable 12 contains a plurality of spaced junction boxes 13 each containing a pair of female receptacle conectors 14, 15. The total number of junction boxes present equals the number of student positions, and they are generally uniformly distributed along the distribution cable.

Figure 3:
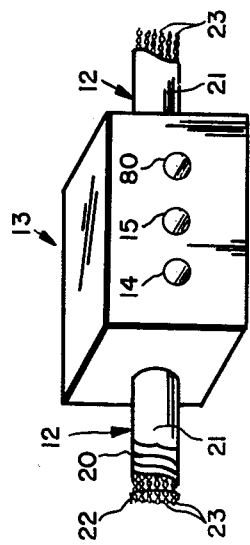
FIG. 3 is perspective view of a typical junction box with attached cable portions.

A cable section and suitable junction box are illustrated in FIG. 3. The cable comprises a flexible corrugated aluminum conduit 20 enabling the cable to be bent or shaped around wall obstructions and designed for easy wall mounting by conventional hangers. The aluminum is covered with an overlay of resilient insulating material 21, e.g. rubber or plastic. The junction boxes 13 may be of metal designed for easy wall mounting and are firmly locked to the cable portions. Within the aluminum shielding 20, which is grounded, is a laced bundle 22 of the required number of stranded wires 23 arranged as twisted pairs. Four wires are required for each student position, two (or one twisted pair) for driving each student headset, and two (or one twisted pair) for carrying the student microphone signals. Thus for 10 student positions, as an example, forty wires will be present in the initial cable, which number will diminish by four at each junction box. The cable 12 may be of uniform diameter, or may periodically reduce in diameter as the number of wires required to be carried are reduced. The female receptacle connectors 14, 15 at each junction box each have two contacts or terminals and are constructed to withstand many connect-disconnect cycles. A pair of male plug conectors 25, 26 (FIG. 1) connected to a small flexible, shielded, 4-wire cable 27 is provided for connection with each of the female receptacles in each junction box. Terminating this interconnecting cable 27 is an integral headset 28 and microphone 29 designed to be worn by each student.

The headsets or headphones 28 are of the high-fidelity, dynamic, low-impedance type, designed for high-noise rejection. They are adjustable to fit either adult or child, and are provided with removable, soft, plastic muffs for enclosing the student's ears to seal off external noise. The removable muffs may be readily sanitized or replaced. The microphones 29 are also of the dynamic, low-impedance type adapted for quality reproduction. They are highly-directional with a high front-to-back ratio and provided with a tapered mouthpiece for close-talking and minimum pickup of background noise.

Figure 4:
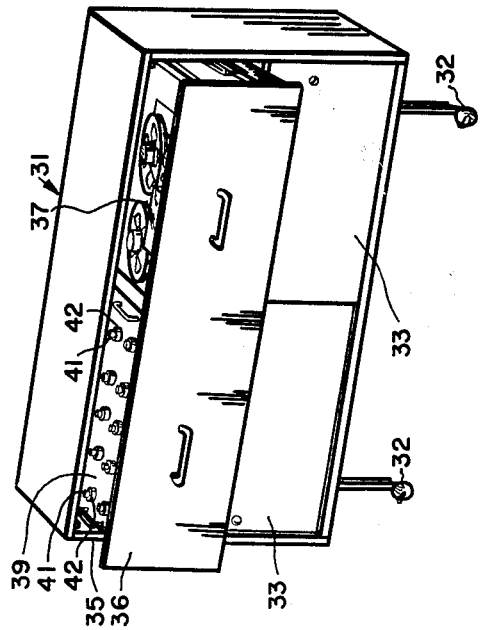
FIG. 4 is a perspective view of the mobile console with open drawer.

Located at the front of the classroom for use by the instructor is a mobile console 31, which is connected by a suitable multi-cable connector 32' to one end of the distribution cable 12. The console 31 contains all the switches, controls, monitors, amplifiers and power sources; in short, the entire electronics for the whole system, except in the event that separate recorders are provided for each student, which will be discussed hereinafter. The console 31 comprises a housing (FIG. 4) mounted on locking wheels 32 or casters so as to be fully mobile and easily rolled from one instruction area to another. Compartments 33 are provided in the lower half of the console for the storage of the instructor's equipment, and in addition the students' headsets, microphones and interconnecting cables plus a number of reels of program tape. In the upper half of the console 35, side-by-side, in a movable drawer 36 are provided an industrial-type heavy duty recorder 37 of generally conventional construction but adapted for multiple recording and playback. A four-head construction for use with tape containing two separate pairs of audio tracks will enable simultaneous playback and recording on a single tape.

The control panel 39 located in the left side of the drawer 36 contains all of the controls and switches for the entire system and contains a special novel chassis that greatly simplifies the internal wiring. As shown in the perspective view in FIG. 5, the novel chassis comprises a top decorative metal panel 40, preferably of aluminum, on the upper half of which are arranged the knobs 41, 42 of the volume controls or potentiometers for all of the student amplifiers. The lower half contains an array of openings through which pass the various remaining switches and controls 43 of the intercommunication and recording system. Mounted beneath the top panel is a subchassis 45 comprising a metal panel, preferably of aluminum, provided with various cutouts 46 at the bottom for mounting of the switches and controls of the intercommunication system, and a depressed or recessed upper section or well 47 containing an array of through, female printed circuit board connectors 48 adapted for the plugging in of plural circuit boards 50 at the bottom. On the recessed section 47, by means of straps 51 are mounted the student volume controls 116, 162, which are wired to the connectors 48. All of the major wiring is done on the subchassis 45, which simplifies assembly and also servicing. Underneath the subchassis is provided a shielded enclosure 53 for each of the student circuit boards 50. The shielding may be described as a honeycomb structure comprising a series of riveted metal panels 54 arranged to form with the subchassis bottom 47 and a bottom lid 55 a plurality of fully-shielded compartments 57 enclosing each of the circuit boards 50 as shown. When the assembly is completed, the closed bottom lid 55 bears against each circuit board 50 holding it firmly and securely in its connector 48. The plates 54 constituting the honeycomb are flat without grooves, and the circuit boards 50 are located relative to their associated connector 48 by using component mounting screws as guide pins or studs. As will be shown later, each of the circuit boards 50 contains three coupling transformers 60 which are mounted on each board on the same side by means of small bolts 61 which pass through the transformer frame and circuit board 50 and are secured tightly by suitable nuts 62. The bolts 61 protrude a short distance 63 from the board, about one-quarter inch, and the female receptacle connector 48 for receiving the board 50 is mounted a like distance 63 from one wall 64 of of the shielding compartment 57. Thus, to insert the circuit board, it is merely necessary to slide it into the compartment with the protruding screws sliding along the nearer wall panel and acting to align the male plug end of the circuit board 50 with the female through connector 48 on the subchassis 45. It will be observed that, when assembled, each of the circuit boards are completely isolated and shielded from its neighbors thereby ensuring against interference or crosstalk. Removal of the bottom lid 55 provides easy access to all the circuit boards 50 for servicing, and removal of the shielding honeycomb 53 provides access to the remaining wiring.

Figure 5:
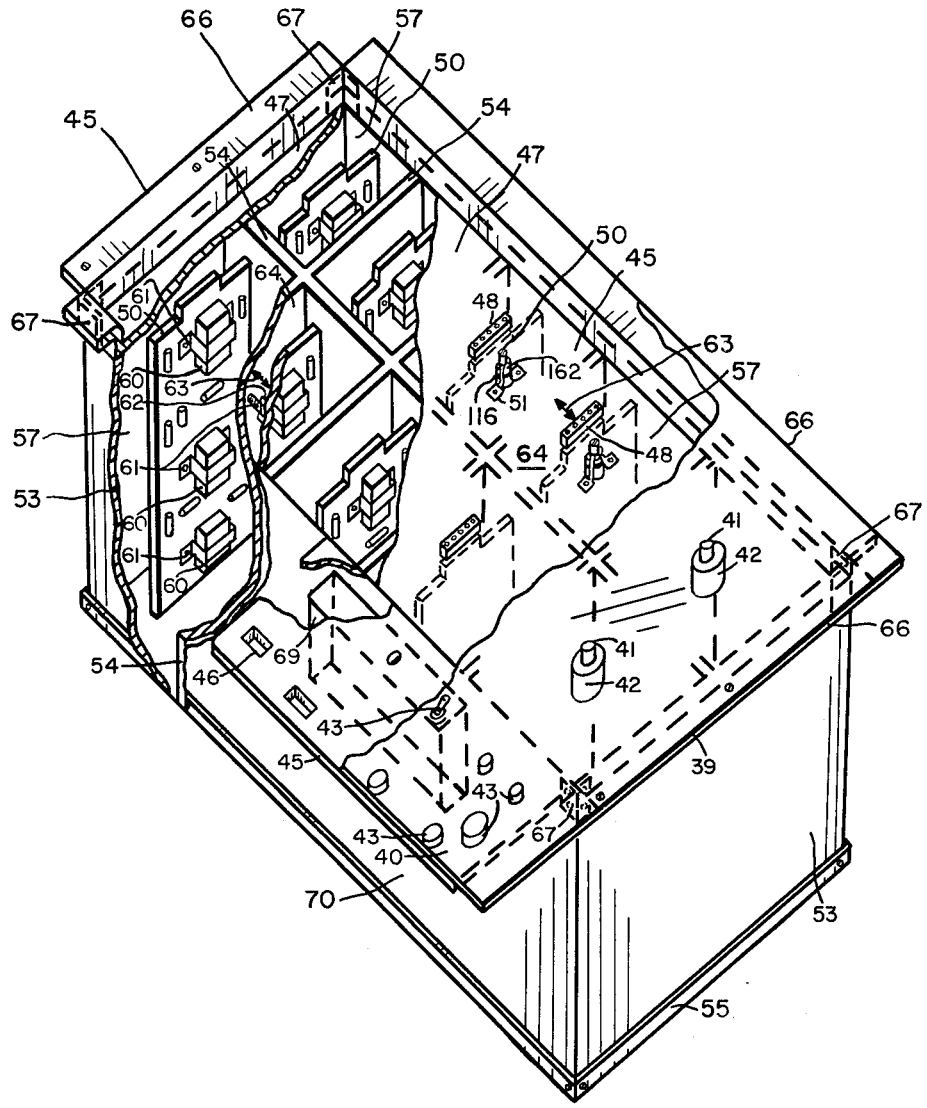
FIG. 5 is a perspective view, with parts broken away to show the interior, of the main chassis within the console.

The subchassis 45 is provided, as shown in FIG. 5, with flanges 66 by which it is mounted or supported within the console drawer 36. The top plate 40 is held on the subchassis 45 by suitable screws. The honeycomb shield 53 has at each upper corner protruding corner portions 67 which embrace the corners of the well 47 in the subchassis 45. The subchassis 45 nests, so to speak, within the protruding corner portions 67 of the shield member 53, and is secured thereto by suitable screws at the corners. The lid 55 is similarly screwed to the bottom of the shield member 53.

The student amplifiers alone are located in the shielding compartments 57, and the instructor amplifier is provided in a separate shielded enclosure 69 mounted on the front wall 70 of the shield member 53. However, it will be appreciated that, space limitations permitting, an additional compartment may be provided beneath the subchassis within the shield member for accommodating the instructor amplifier if desired. The power supplies or sources, which are conventional, may be located beneath or behind the tape-recorder 37, and may be coupled to the circuits on the subchassis by suitable cables and connectors.

Figure 6:
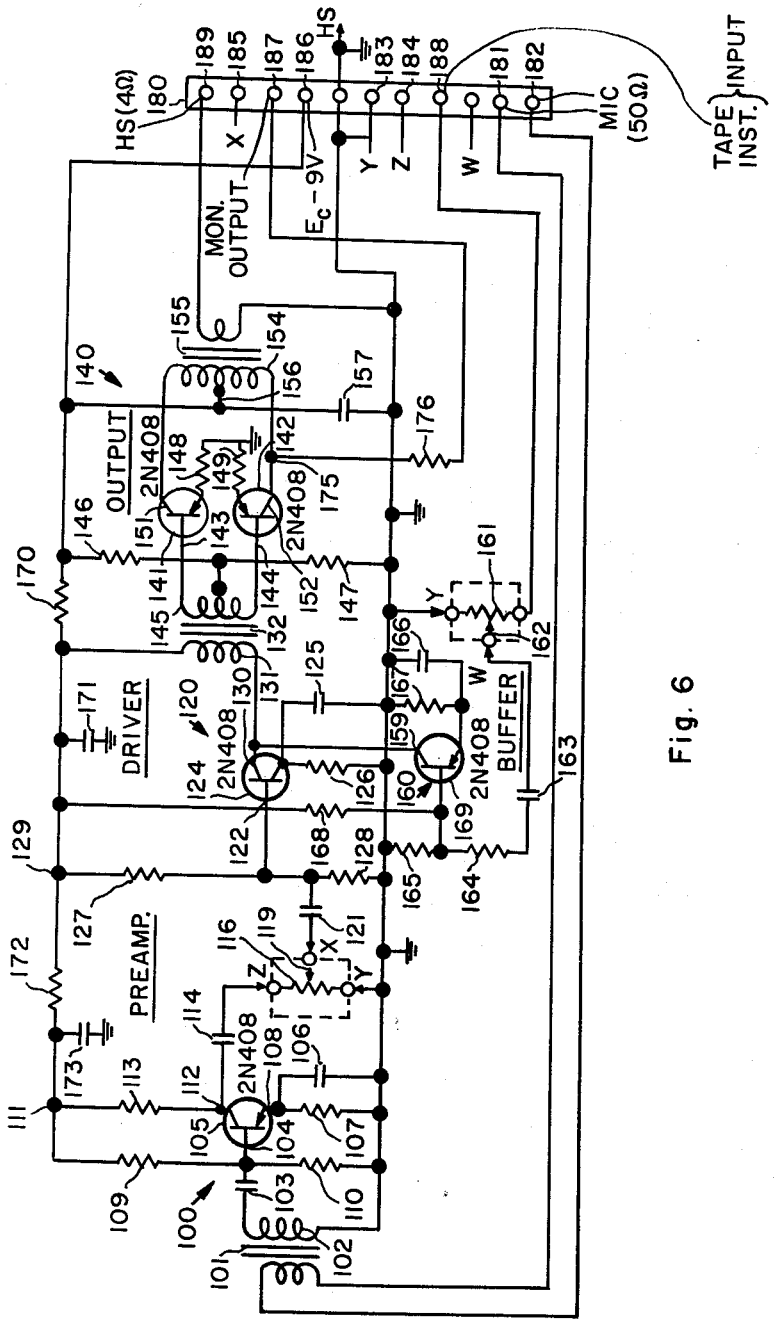
FIG. 6 is a circuit diagram of a student amplifier arranged on the circuit board.

FIG. 6 shows in detail a circuit diagram of the electronics provided on each of the printed circuit boards 50 illustrated in FIG. 5. The circuit shown includes a pre-amplifier stage 100, a first driver stage 120 coupled to the output of the preamplifier stage 100, and a power output stage 140 coupled to the output of the first driver stage 120. It also includes a separate, independent, buffer driver stage 160 having a common output or load with the first driver stage 120. The circuit board also includes a set of terminals 180 at one end providing input, output and volume control connections for the circuit, and adapted to be plugged into the female connector 48 on the subchassis 45.

In more detail, terminals 181 and 182 constitute the microphone input terminals to the preamplifier stage 100, which is a class A transformer coupled input R-C coupled output, common-emitter stage including an impedance-matching input transformer 101 whose secondary 102 is direct-current isolated by a signal coupling capacitor 103 from the base electrode 104 of a p-n-p transistor 105. Proper biasing of the amplifier for minimum distortion is obtained by a capacitor 106 bypassed resistor 107 in the emitter 108 circuit, in cooperation with a voltage divider represented by resistors 109 and 110 connected from a negative source potential point 111, to the base 104, to ground. The collector electrode 112 is connected to a load resistor 113 connected to the same potential point 111. A signal coupling capacitor 114 connects the collector electrode 112, via terminals 183 and 184 on the board, to a volume control potentiometer 116 which is not mounted on the circuit board but is located in the well 47 on the subchassis 45. A second coupling capacitor 121 connected to the wiper arm 119 of the volume control 116, via terminal 185, feeds the signal to the base electrode 122 of a second p-n-p transistor 124. Biasing is again provided by a bypassed 125 emitter resistor 126, and voltage dividing resistors 127 and 128 connected to a second negative potential point 129. The collector 130 of the second transistor 124 is connected via the primary 131 of a coupling transformer 132 to the same potential point 129. This second, class A, common emitter driver stage has a transformer-coupled output for driving the power or output stage 140, which is a class B, common emitter, push-pull circuit for low distortion comprising a pair of p-n-p transistors 141, 142 whose base electrodes 143, 144 are connected across the secondary 145 of its input transformer 132, the center tap of which secondary is connected to two resistor 146, 147 constituting a bias-providing voltage divider connected across the supply voltage derived from terminal 186. As will be observed, the input supply source from terminal 186 is decoupled via a resistor 170 and a capacitor 171 from the second supply point 129, which is in turn decoupled via a resistor 172 and a capacitor 173 from the first supply point 111. Additional degenerative feedback is provided in the output stage by unbypassed emitter resistors 148 and 149, which also provide temperature compensation and stabilization of the operating point to further minimize distortion. The collectors 151, 152 of the two output transistors 141, 142 are connected across the primary 154 of an output, impedance-matching and isolation transformer 155, the center tap 156 of which winding is connected to the supply source, which is further decoupled by a capacitor 157. A signal connection 175 is made to one of the collectors 152 of the output transistor 142, and is connected via a resistor 176 to a terminal 187 on the board. This represents the monitor output, by which the instructor will be able to listen in to what the student is saying.

Care is taken to ensure quality reproduction to minimize student fatigue. For example, the coupling transformers have high permeability steel cores and tightly wound windings to minimize stray pick-up. Stabilization is provided for all the transistor, and overloading is avoided. Positive feed-back is avoided by signal decoupling of each of the stages. Degenerative feedback is employed to reduce distortion and improve the frequency response. It will also be observed that the signal input from the student microphone is via a low-impedance line to avoid pick-up and interfering noise, and the return line to the student headset via terminal 189 is also a low impedance line for similar reasons. The output transformer 155 also isolates the student from the source supply preventing shock hazard.

Since the switching system provides for the instructor communicating with all the students simultaneously, and, of course, the program signal is intended to be fed to many students at the same time, it has been found essential to completely isolate each preamplifier stage from all the other preamplifier stages to prevent signals from one student microphone from being coupled via the common program source or the instructor's monitor circuit to the neighboring preamplifier causing disturbing noises and cross-talk. To this end, while the student microphone signal feeds into the preamplifier 100, the signals from the program source or instructor are introduced into the amplifier after the preamplifier and just before the output stage 140. This is accomplished in a preferred form by providing an additional amplifying or buffer stage 160, which is essentially similar to the driver stage 120 but is completely separated therefrom except for a common load, i.e., the primary winding 131 of the interstage transformer 132. The buffer stage 160 has an R-C coupled input from terminal 188 through a second potentiometer 161 serving as a second volume control for the program and instructor voice signals. This second volume control is also not mounted on the circuit board, but is mounted together with the student volume control 116 on the subchassis 45, in a coaxial shaft arrangement with dual knobs controllable by the instructor. From the volume control tap 162, the signal is conveyed via a coupling capacitor 163 and a signal attenuator in the form of a voltage divider 164, 165 to provide the proper drive for the buffer amplifier to the base of a grounded emitter, p-n-p transistor 169 stage employing a bypassed 166 resistor 167. Biasing is also provided by resistors 168 and 165 in the base circuit. The collector 159 circuit contains the output signal for coupling to the output stage. With this arrangement, there is no possible way for signals from one student microphone to be coupled via the program source to another student's headset. The buffer stage effectively isolates the two input sources.

The instructor has a similar circuit board with preamplifier 100, driver 120, output 140 and buffer 160 stages. Similarly to what was stated above, to prevent student coupling by way of the instructor's amplifier, the monitor tap 175 to each student's output stage is fed not into the instructor's preamplifier 100 but into the instructor's buffer 160 instead.

Figure 2:
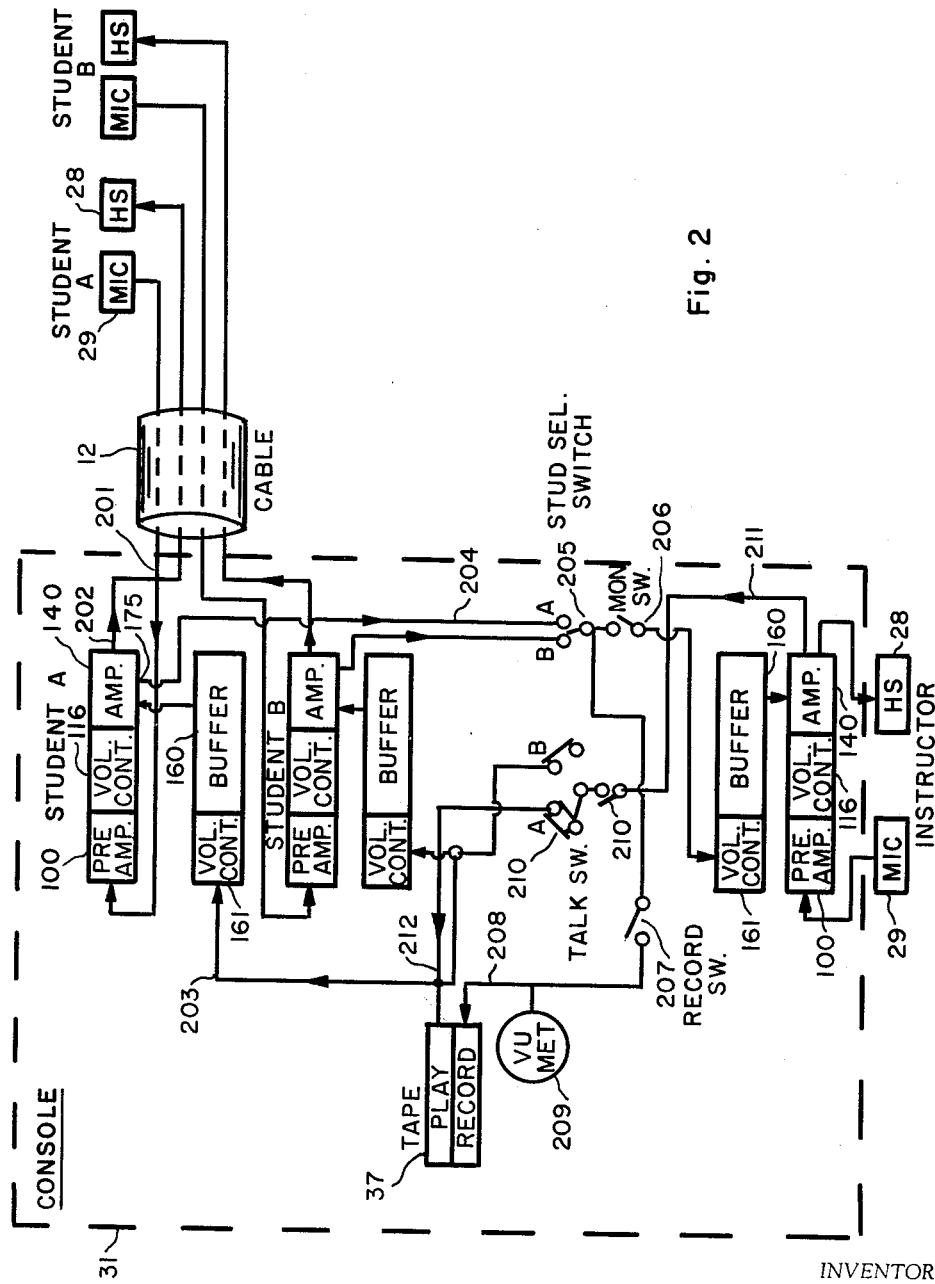
FIG. 2 is a block diagram of the teaching system of the invention.

A schematic block diagram for the entire system is illustrated in FIG. 2. The console 31 is represented by the dashed lines, and contains the entire electronics of the system. Generally the students are separated into several groups at different levels, with all of the students in one group, or the several groups, receiving the same program material. For simplicity, 10 student positions have been illustrated in FIG. 1, divided into two groups, group A and group B. In actual practice, provision would be made for thirty students, separated into two or three groups, as typical of the average classroom size. Each of the students has his own microphone 29 and headset 28 connected to their individual amplifiers in the console 31 by the routing cable 12. As shown in FIG. 2, the microphone connects via a line 201 into the student preamplifier 100, and the output signal from the output stage 140 via line 202 is connected to the student headset 28. The volume control 116 controls the loudness of the student voice signals. The program signals derive from a tape player-recorder 37 with one channel on the tape supplying program material for the A and B students, or if desired, with an additional player-recorder, a second tape simultaneously supplying program material for the B students. The program signals are fed via line 203 through the loudness or volume control 161 into the buffer stage 160 of each of the student amplifiers, and the amplified output signal then supplied to each student headset.

The instructor monitors the student's lessons and responses by deriving at 175 a signal from the output stage and transmitting it via conductor 204 through a student selector switch 205, whereby the instructor can select which particular student of a particular group it is desired to monitor. Closing of a monitor switch 206 introduces the student output signals through a loudness control 161 in the instructor amplifier into the instructor buffer 160, and from thence to the output stage 140 and to the instructor's headset 28. By closing a record switch 207, or if desired coupled together with a separate student selector switch, any of the student's signals can be simultaneously recorded on a second tape channel in the tape recorder 37 via line 208. A recording level meter 209 may be provided to control the recording level. The instructor can talk to one or more students by means of a talk selector switch 210 coupled via line 211 and 212 into the buffer stages 160 of the selected students. In sum, with appropriate switching circuitry, all simply controllable by the instructor, audio instruction can be routed to all the student positions with the instructor monitoring, communicating with, and recording any position. By means of external tape recorders, different levels of instruction can be presented, monitored and recorded at the same time.

Various modifications are possible within the scope of the invention. For example, the program source may include, in addition to a tape player, a phonograph or radio receiver. Also, a monaural tape recorder at lower cost may be substituted for the stereo, industrial-type described. If a line voltage source is available next to each junction box, a separate portable tape recorder may be provided for each student for him to record his own performance. To this end, a third receptacle 80 may be provided in each junction box 13 (see FIG. 3), the contacts of which third receptacle 80 may be internally wired in parallel to the receptacle contacts 15 for connection to the students' headset. Plugging in of the tape recorder microphone input to the third receptacle 80 will thus enable the student headset signals while being received to be recorded. Transistorized amplifiers are preferred, not only because servicing is reduced, but also because of its low power requirements and reduced heat generation. Also, low operating voltages minimize shock hazard. The low-impedance studio-type distribution system employed reduces pickup and crosstalk and minimizes the shielding problem. Also, the voltages and currents to which the students are exposed are small, reducing the shock hazard.

An operating system which has proved very satisfactory had a frequency response from microphone to tape recorder of ±3 db from at least 100 to 7500 cycles per second, and from recorder playback to headsets of ±2 db from at least 50 to 15,000 cycles per second, with 2% maximum audio distortion for the former, and 5% maximum distortion for the latter. Noise and crosstalk were minimal.

While an embodiment of the invention has been illustrated with ten student positions and ten student amplifiers, it will be appreciated that the choice of ten was arbitrary to illustrate the invention in a sufficiently clear manner without unduly cluttering up the drawings. In actual practice, for the average classroom, provision will be made for thirty student positions and thirty student amplifiers. In such event, in the subchassis the printed circuit boards could be arranged in three rows of ten each, with accommodation also for the instructor amplifier. Increasing the number of student amplifiers in nowise changes the operation of the system and the principles set forth above apply equally well thereto. This feature of the invention, which is a consequence of the low-impedance system enabling ready lengthening of the distribution cable without suffering undue signal losses or deterioration in the system fidelity, enables the apparatus of the invention to be readily adapted to any classroom requirements.

As will be evident from the foregoing description, the invention provides an electronic teaching system that can be installed quickly and inexpensively in any ordinary classroom or in several classrooms thereby converting it or them at low cost into language laboratories. The provision of a mobile console containing all the required electronics connectable to a simple wall mounted routing cable eliminates the need for expensive and cumbersome sound-proofed booths. Yet, complete student isolation is afforded by noise-cancelling, interference-free microphones and headset earphones. Crosstalk and pickup of spurious noise is minimized by properly shielded and isolated separate amplifiers, and by the use of low-impedance transmission lines which give minimum trouble from stray pickup without adversely affecting the frequency response. High quality reproduction is maintained through stabilized transistorized amplifiers provided with degenerative feedback, and dynamic microphones and earphones. Low cost construction without sacrificing fidelity is afforded by a novel chassis construction which simplifies wiring and assembly yet affords easy access to the amplifiers and switching circuitry for servicing when necessary. The elimination of obstructing booths simplifies the employment of visual teaching aids. Because of the quality reproduction afforded, the apparatus can also be employed for musical instruction and appreciation, speech therapy, and similar educational applications. The foregoing advantages will lead to the wider use of this excellent teaching adjunct.

It will be appreciated that, although the invention has been described in connection with specific constructions and embodiments, many modifications may be made therein, and it is intended by the appended claims to cover all such modifications as fall within the true spirit and scope of the invention.

What is claimed is:

1. An electronic teaching system comprising a mobile console assembly adapted to be removably connected to an audio cable, said console comprising a plurality of audio amplifiers each mounted on a separate circuit board having plug terminals at one end, a plurality of volume controls each connected to but separated from one of the circuit boards, a first chassis member, a second subchassis member mounted underneath the first chassis member and having a well, said volume controls being mounted on the second subchassis member within the well, a plurality of circuit board connectors mounted on the second subchassis within the well, said circuit boards each being plugged into one of the connectors and extending downward beneath the second subchassis, and a shielding member mounted on and beneath the second subchassis and comprising plural shielding elements providing with the second subchassis member plural shielded compartments each accommodating and surrounding a circuit board and substantially isolating each of the audio amplifiers mounted thereon from one another.

2. An electronic teaching system as set forth in claim 1, wherein the shielding member includes a bottom closure abutting the lowermost portion of each circuit board and maintaining it connected to its connector on the second subchassis.

3. An electronic teaching system as set forth in claim 1, wherein each of the circuit boards contains an electrical component mounted thereon by means of studs which project a given distance from the plane of the board, and the plural shielded compartments each includes one shielding wall element extending downwardly from the second subchassis and spaced substantially the same given distance from the associated circuit board connector, said studs on the circuit board abutting the said one wall element and serving to guide the board plug terminals into the associated connector.

4. An audio-active electronic teaching system comprising a console comprising plural audio amplifiers each containing active elements mounted on a separate circuit board, means for introducing program material audio signals into the audio amplifiers, a connector associated with the console and connected to the audio amplifiers, switching means on the console for directing the signal flow through the console, an elongated, flexible shielded electric cable adapted for connection to the console connector and adapted to be extended within and around a classroom in the vicinity of its side walls, said classroom being substantially free of obstructing booths and containing students to be taught, said cable containing plural wires and plural coupling means along its length, connected to separate ones of the wires, for connection to a headset and microphone, plural headset and microphone combinations each adapted to be separately connected to one of the coupling means and to be used by one of the students for receiving the program material and responding thereto, means at the console for monitoring and communicating separately with each of the students via the cable, and means within the console for separately enclosing each circuit board and separately shielding each of the audio amplifiers mounted thereon from each other to minimize crosstalk and interference.

5. An audio-active electronic teaching system comprising a fully mobile console comprising plural separately mounted audio amplifiers containing all of the system's active elements, means for introducing program material audio signals into the audio amplifiers, a connector associated with the console and connected to the audio amplifiers, switching means on the console for directing the signal flow through the console, a wall-mounted, resilient, metal shielded electric cable adapted for connection to the console connector and adapted to be extended around a classroom free of obstructing booths and containing students to be taught, said cable containing plural wires and plural coupling means along its length, connected to separate ones of the wires, for connetcion to a headset and microphone, plural headset and microphone combinations each adapted to be separately connected to one of the coupling means and to be used by one of the students for receiving the program material and responding thereto, means at the console for monitoring and communicating separately with each of the students via the wall cable, and means comprising a conductive honeycomb structure providing plural shielded compartments each accommodating inside a compartment one of said separately mounted audio amplifiers for shielding them from each other to avoid crosstalk and interference.

6. An electronic teaching system comprising a mobile console assembly adapted to be removably connected to an audio cable, said console comprising a plurality of separate audio amplifiers each mounted on a separate circuit board having plug terminals at one end, a plurality of volume controls each connected to one of the audio amplifiers but separated from the associated circuit board, a conductive chassis member in the console, a plurality of circuit board connectors mounted on the chassis member, said circuit boards each being plugged into one of the connectors and extending downward beneath the chassis member, and a shielding member mounted on and beneath the chassis member and comprising plural conductive shielding members providing with the chassis member plural separate shielded compartments each accommodating and surrounding a separate circuit board and substantially isolating each of the audio amplifiers mounted thereon from one another.

7. An electronic teaching system as set forth in claim 6, wherein each of the circuit boards contains an electrical component mounted thereon by means of studs which project a given distance from the plane of the board, and the plural shielded compartments each include one shielding wall member extending downwardly from the chassis member and spaced substantially the same given distance from the associated circuit board connector, said studs on the circuit board abutting the said one wall member and serving to guide the board plug terminals into the associated connector.

References Cited by the Examiner
UNITED STATES PATENTS

| | | | |
|---|---|---|---|
| 2,512,138 | 6/50 | Butt | 317—101 X |
| 2,798,172 | 7/57 | Jones. | |
| 2,864,977 | 12/58 | Witt et al. | 317—101 |
| 2,963,577 | 12/60 | Errichiello et al. | 317—101 X |
| 3,045,065 | 7/62 | Metzner | 35—35.3 X |

OTHER REFERENCES

"A Language Laboratory Handbook for 1960," D. L. Health, received in the Scientific Library June 19, 1961; 81 pages, pages 17, 24, 25 and 30 relied on.

"The Chester Language Laboratory" booklet, December 1960; 24 pages, pages 7, 8, 13, 14, 16–20 relied on.

JEROME SCHNALL, *Primary Examiner.*

L. SMILOW, LAWRENCE CHARLES, *Examiners.*